US010122966B2

(12) United States Patent
Horio et al.

(10) Patent No.: US 10,122,966 B2
(45) Date of Patent: Nov. 6, 2018

(54) INFORMATION DISPLAY SYSTEM AND INFORMATION DISPLAY TERMINAL

(71) Applicant: Panasonic Intellectual Property Management Co., Ltd., Osaka (JP)

(72) Inventors: Kazuyuki Horio, Tokyo (JP); Ryuuichi Yatsunami, Fukuoka (JP); Nobutaka Kodama, Fukuoka (JP); Yuuji Abe, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/580,755

(22) PCT Filed: May 11, 2016

(86) PCT No.: PCT/JP2016/002304
§ 371 (c)(1),
(2) Date: Dec. 8, 2017

(87) PCT Pub. No.: WO2016/208111
PCT Pub. Date: Dec. 29, 2016

(65) Prior Publication Data
US 2018/0152668 A1 May 31, 2018

(30) Foreign Application Priority Data
Jun. 25, 2015 (JP) .................................. 2015-128135

(51) Int. Cl.
*H04N 7/14* (2006.01)
*H04M 11/00* (2006.01)
(Continued)

(52) U.S. Cl.
CPC ........... *H04N 7/147* (2013.01); *G06F 1/1605* (2013.01); *G06F 3/04883* (2013.01);
(Continued)

(58) Field of Classification Search
CPC .. H04N 7/147; H04N 1/00281; G06F 1/1605; G06F 3/04883; G06F 21/31; G06K 7/1095; G06K 7/1417; G06Q 30/0601
See application file for complete search history.

(56) References Cited

U.S. PATENT DOCUMENTS 5,239,373 A * 8/1993 Tang .................. H04N 1/00283
178/18.01
5,636,039 A 6/1997 Tanno et al.
(Continued)

FOREIGN PATENT DOCUMENTS

JP 6-30408 2/1994
JP 2004-056207 2/2004
(Continued)

OTHER PUBLICATIONS

English translation for JP 2004056207 A.*
(Continued)

*Primary Examiner* — Stella Woo
(74) *Attorney, Agent, or Firm* — Wenderoth, Lind & Ponack, L.L.P.

(57) ABSTRACT

It is possible to provide a sense of realism that a user actually faces a communication partner and to accurately and simply transmit information. In information display system (5), first display panel (21) displays a face and a part of an upper body of an operator op captured by third camera (63) and second display panel (22) displays hands of operator op captured by fourth camera (64) in information display terminal (10). In information provision terminal (50), third display panel (53) displays a face of the user captured by first camera (31), and fourth display panel (54) displays hands of the user captured by second camera (32).

10 Claims, 5 Drawing Sheets

(51) Int. Cl.
- *H04N 7/15* (2006.01)
- *G06F 1/16* (2006.01)
- *G06F 3/0488* (2013.01)
- *H04N 1/00* (2006.01)
- *G06F 21/31* (2013.01)
- *G06K 7/10* (2006.01)
- *G06K 7/14* (2006.01)
- *G06Q 30/06* (2012.01)

(52) U.S. Cl.
CPC ........ *H04M 11/00* (2013.01); *H04N 1/00281* (2013.01); *H04N 7/15* (2013.01); *G06F 21/31* (2013.01); *G06K 7/1095* (2013.01); *G06K 7/1417* (2013.01); *G06Q 30/0601* (2013.01)

(56) References Cited

U.S. PATENT DOCUMENTS 6,195,176 B1  2/2001  Tanno et al.
2006/0181607 A1*  8/2006  McNelley .......... G02B 27/2292 348/14.08
2008/0184124 A1*  7/2008  Agarwal ................ G06Q 10/10 715/733
2013/0215292 A1*  8/2013  Reichelt .................. G06T 11/00 348/239

FOREIGN PATENT DOCUMENTS

JP  2004056207 A *  2/2004
JP  2004-147105  5/2004

OTHER PUBLICATIONS

International Search Report dated Aug. 16, 2016 in International (PCT) Application No. PCT/JP2016/002304.
Extended European Search Report dated May 28, 2018 in European Application No. 16813887.3.

* cited by examiner

FIG. 5
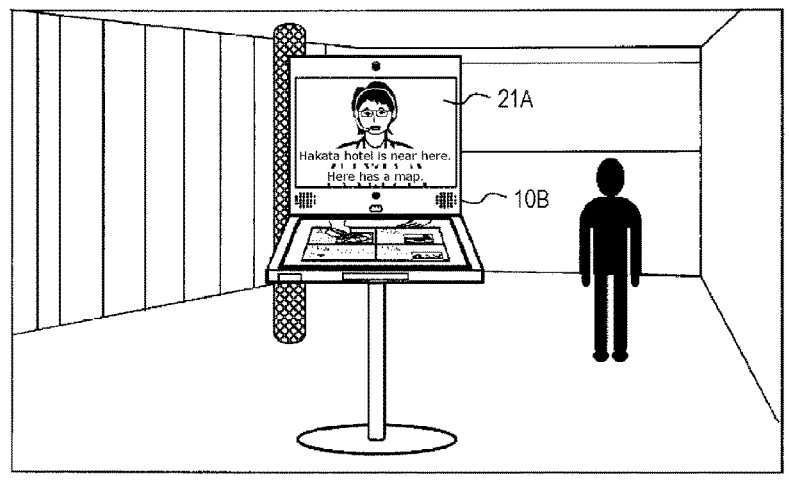
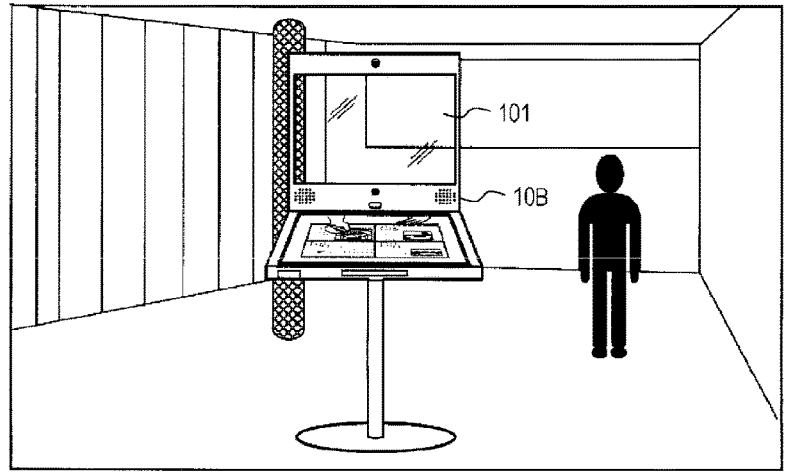

INFORMATION DISPLAY SYSTEM AND INFORMATION DISPLAY TERMINAL

TECHNICAL FIELD

The present disclosure relates to an information display system and an information display terminal which display information.

BACKGROUND ART

In the related art, a multimedia terminal (for example, refer to PTL 1) has been known which performs communication with an operator who is a communication partner existing in a separated location, and enables a user to exchange various pieces of information with a feeling of facing the operator.

The multimedia terminal disclosed in PTL 1 includes cameras and three displays, captures a face and vicinity of hands of the user using the cameras, and transmits captured pictures to a terminal of the operator. In addition, among the three displays, the multimedia terminal causes a first display to displays the face of the user, causes a second display to display multimedia information, such as text, still images, and moving images, and causes a third display to display a touch panel and an input panel on which it is possible to input characters, symbols, and the like. Furthermore, the multimedia terminal includes a microphone and a speaker.

CITATION LIST

Patent Literature

PTL 1: Japanese Unexamined Publication No. 2004-147105

SUMMARY OF THE INVENTION

However, in a configuration of PTL 1, the display of the multimedia terminal, with which the user is in contact, only displays a picture of the face of the operator, and thus a sense of realism that the user actually performs exchange with the operator is not sufficiently provided.

In addition, even though the operator tries to transmit information to the user, it is difficult to accurately and simply transmit the information. For example, even though the operator tries to vocally transmit a location in a facility, which is drawn on a map, to the user, it is difficult to teach an accurate location using only verbal instruction. As a result, the information display terminal according to the related art including PTL 1 is short of convenience for the user.

The present disclosure is made in consideration of the above-described situations according to the related art, and an object of the present disclosure is to provide an information display system and an information display terminal in which it is possible to provide the sense of realism that a user actually faces a communication partner and to accurately and simply transmit information.

The present disclosure provides an information display system, in which an information display terminal that can be operated by a user and an information provision terminal that can be operated by an operator are communicably connected, in which the information display terminal includes a first camera that captures an image of a face of the user; a second camera that captures an image of vicinity of hands of the user; a first communicator that transmits data, which includes the image of the face of the user captured by the first camera and the image of the vicinity of the hands of the user captured by the second camera, to the information provision terminal, and receives an image of a face and at least a part of an upper body of the operator and an image of vicinity of hands of the operator, which are transmitted from the information provision terminal; a first display panel that displays the image of the face and at least the part of the upper body of the operator; and a second display panel that displays the image of the vicinity of the hands of the operator, and in which the information provision terminal includes a third camera that captures the face and at least the part of the upper body of the operator; a fourth camera that captures the hands of the operator; a second communicator that transmits data, which includes an image of the face and at least the part of the upper body of the operator captured by the third camera, and the image of the vicinity of the hands of the operator captured by the fourth camera, to the information display terminal, and receives the image of the face of the user and the image of the vicinity of the hands of the user, which are transmitted from the information display terminal; a third display panel that displays the image of the face of the user captured by the first camera; and a fourth display panel that displays the image of the vicinity of the hands of the user captured by the second camera.

In addition, the present disclosure provides an information display terminal, which is communicably connected with an information provision terminal that can be operated by an operator and can be operated by a user, including: a first camera that captures an image of a face of the user; a second camera that captures an image of vicinity of hands of the user; a communicator that transmits data, which includes the image of the face of the user captured by the first camera and the image of the vicinity of the hands of the user captured by the second camera, to the information provision terminal, and receives an image of a face and at least a part of an upper body of the operator and an image of vicinity of hands of the operator, which are transmitted from the information provision terminal; a first display panel that displays the image of the face and at least the part of the upper body of the operator; and a second display panel that displays the image of the vicinity of the hands of the operator.

According to the present disclosure, it is possible to provide the sense of realism that a user actually faces a communication partner and to accurately and simply transmit information.

BRIEF DESCRIPTION OF DRAWINGS

FIG. 5 is a diagram illustrating an example of display of information inside a store where an information display terminal according to a third exemplary embodiment is installed.

DESCRIPTION OF EMBODIMENTS

Hereinafter, exemplary embodiments, in which an information display system and an information display terminal according to the present disclosure are disclosed in detail, will be described in detail with reference to the appropriate accompanying drawings. However, there is a case where unnecessarily detailed description is omitted. For example, there is a case where detailed description of already well-known matters or repeated description of substantially the same configuration is omitted. The reason for this is to avoid description below being unnecessarily redundant for easy understanding of those skilled in the art. Meanwhile, the accompanying drawings and the description below are provided such that those skilled in the art sufficiently understand the present disclosure, and it is not intended to limit subjects disclosed in claims. Information display systems according to the respective exemplary embodiments below are applied to systems in which a user who is, for example, a customer entered in a facility communicates with an operator who is waiting at an operation center at a distance and it is possible to receive various pieces of guidance from the operator.

First Embodiment

Figure 1:
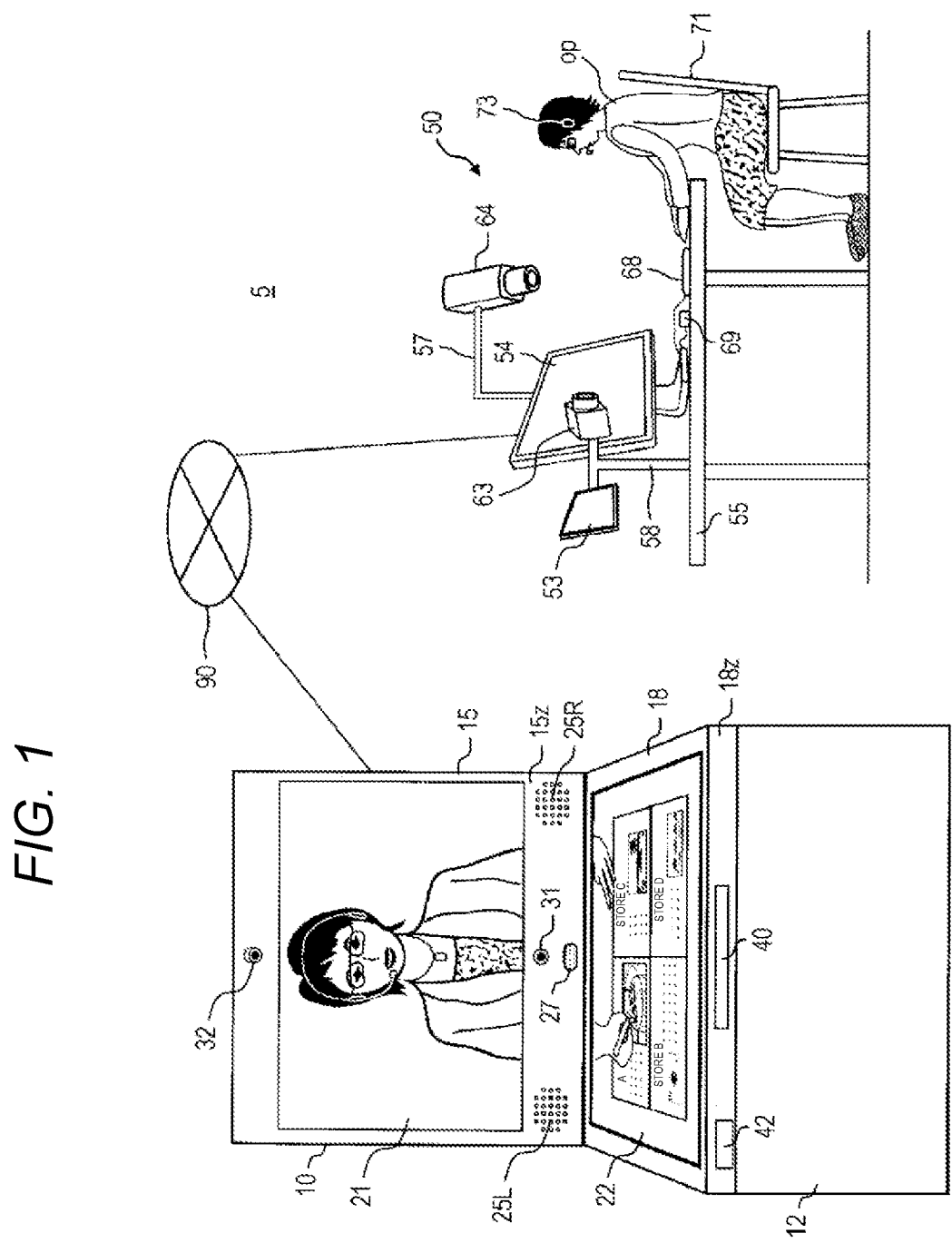
FIG. 1 is a diagram illustrating an example of a schematic configuration of an information display system according to a first exemplary embodiment.

FIG. 1 is a diagram illustrating an example of a schematic configuration of information display system 5 according to a first exemplary embodiment. Information display system 5 includes user-side information display terminal 10 and operator-side information provision terminal 50, which are connected to each other through network 90. Information display terminal 10 and information provision terminal 50 are capable of communicating various data (text data, picture data, sound data, and the like) with each other through network 90.

A wired Local Area Network (LAN), which is connected to a wide area network, such as the Internet, a wireless LAN, a dedicated line, or the like is used for network 90. In addition, both information display terminal 10 and information provision terminal 50 are capable of accessing various server devices (not illustrated in the drawing) which are connected to network 90.

Information display terminal 10 is loaded on box-shaped stand 12 having a certain height to be adjusted to a height of a person. Stand 12 is integrated with information display terminal 10 by, for example, being coated with the same color as a housing of information display terminal 10 or being covered by a cover which is common to information display terminal 10. Information display terminal 10 includes first housing 15 that is provided to protrude upwards so as to face a face of the user, and a second housing 18 that is extended to the front such that hands of the user (that is, the span of the hands, which includes some parts of hands, arms, palms, nails, and the like. The same hereinafter) can be in contact with.

On a front surface of first housing 15, first display panel 21 is provided on which an image of a face and at least a part of an upper body of an operator captured by third camera 63, which will be described later, is projected. On first display panel 21, the image of the face and at least the part of the upper body of the operator is displayed in a size which is approximately the same as an actual size. Therefore, the user acquires a sense of realism that the user actually faces the operator. In addition, an upper front of first housing 15 is provided with second camera 32 that captures the hands of the user. A lower front of first housing 15, that is, middle part 15z of the housing between first display panel 21 and second display panel 22 are disposed, becomes an area in which the display panel is not disposed. Middle part 15z is provided with first camera 31 that captures the image of the face and at least the part of the upper body of the user. In addition, middle part 15z is provided with a left-and-right pair of speakers 25L and 25R (an example of an output device) that output sound data emitted by the operator and microphone 27 (an example of an input device) that absorbs sound emitted by the user. In a case where the output device and the input device are disposed in middle part 15z of the housing between first display panel 21 and second display panel 22 are disposed, the operator is naturally projected onto first display panel 21, and thus increase in the sense of realism is further expected.

In contrast, an upper surface of second housing 18 is provided with second display panel 22 onto which an image of vicinity of the hands of the operator captured by fourth camera 64, which will be described later, is displayed an UI screen, and the like are reflected. Second display panel 22 may include a display device that only displays a picture, or may include a touch panel on which it is possible to perform a touch input operation. In a case where second display panel 22 includes the touch panel, information acquired through touch input is transmitted, from information display terminal 10 to information provision terminal 50 or various server devices which are connected to network 90. Here, the case where second display panel 22 includes the touch panel will be illustrated.

In addition, front end surface 18z of second housing 18 is disposed with an exhaust slot of printer 40 that is capable of performing hard copy of the screen which is displayed on second display panel 22. A main body of printer 40 is embedded in stand 12. In addition, front end surface 18z of second housing 18 is installed with reading device 42 that reads authentication information (for example, various pieces of information relevant to a card, which are requested in a case where a card settlement process is performed, and a password number such as Personal Identification Number (PIN)) used to perform personal authentication of the user.

In contrast, information provision terminal 50 is loaded on desk 55. In front of desk 55, operator op with headset 73 is sitting on chair 71 in a posture that is easy to perform guidance. Headset 73 is connected to information provision terminal 50, outputs sound emitted by the user, and absorbs sound emitted by the operator.

In addition, third display panel 53, onto which the image of the face and at least a part of the upper body of the user captured by first camera 31 is displayed, and third camera 63, which captures the image of a face and at least the part of the upper body of operator op, are supported by stand 58 attached to desk 55.

In addition, desk 55 is provided with fourth display panel 54 that displays the image of the vicinity of the hands of the user captured by second camera 32. A screen size of fourth display panel 54 is larger than that of third display panel 53, and is configured such that operator op easily recognizes the hands of the user. Fourth display panel 54 may include a display device that simply displays a picture, and may include a touch panel on which it is possible to perform the touch input operation. In a case where fourth display panel 54 includes the touch panel, information acquired through the touch input is transmitted from information provision terminal 50 to information display terminal 10 and various server devices which are connected to network 90. Here, the case where fourth display panel 54 includes the touch panel will be illustrated.

In addition, a tip of arm 57, which is extended from the back of fourth display panel 54 in an L-shape, is provided with fourth camera 64 that captures an upper surface of desk 55, which includes the hands of operator op. Fourth camera 64 is capable of capturing the hands of operator op and is capable of capturing a material, such as a pamphlet, which is loaded on desk 55. In addition, information provision terminal 50 is capable of capturing a Web site, an UI screen, and the like, which are displayed on fourth display panel 54, as the picture captured by fourth camera 64. In addition, console 68, such as a keyboard or a mouse, and scanner 69 are loaded on desk 55.

As described above, user-side information display terminal 10 displays the image of the face and at least the part of the upper body of operator op on first display panel 21 based on the image data received from information provision terminal 50, and displays the image of the vicinity of the hands of operator op, the UI screen, and the like on second display panel 22. Meanwhile, in a case where operator op loads the material, such as the pamphlet, on the surface of desk 55, second display panel 22 displays the material as well. In addition, information display terminal 10 outputs the sound data, which is received from information provision terminal 50, from speakers 25L and 25R, and transmits the sound data, which is absorbed by microphone 27, to information provision terminal 50.

In contrast, operator-side information provision terminal 50 displays the image of the face and at least the part of the upper body of the user on third display panel 53 based on the picture data, which is received from information display terminal 10, and displays the image of the vicinity of the hands of the user or the like on fourth display panel 54. In addition, information provision terminal 50 outputs the sound data, which is received from information display terminal 10, from speaker 73z of headset 73, and transmits the sound data, which is absorbed by microphone 73y of headset 73, to information display terminal 10. A displayable area of third display panel 53 according to the first exemplary embodiment may be smaller than that of fourth display panel 54 which displays the image of the vicinity of the hands of the user or the like. The reason for this is as follows. An important thing for the operator is that operator op shares a spot, which is directed by the user, in a size similar to the user with respect to second display panel 22 which displays information (for example, the pamphlet, a map, or the like) around the hands of operator op captured by fourth camera 64. A certain size is necessary for the displayable area of fourth display panel 54 which displays the image of the vicinity of the hands of the user or the like. Furthermore, it is desired that a resolution and the number of pixels of fourth display panel 54 are similar to those of user-side second display panel 22. However, fourth display panel 54 may be a general-purpose monitor. In contrast, third display panel 53, which displays the face of the user (or the face and at least the part of the upper body), may be provided to the extent that operator op understands an expression of the user and a situation of background, and thus the displayable area may not be large, and a high resolution and a large number of pixels are not necessary. Therefore, the displayable area of third display panel 53 may be smaller than that of fourth display panel 54 which displays the image of the vicinity of the hands of the user or the like, and the resolution and the number of pixels of third display panel 53 may be lower than those of fourth display panel 54. Third display panel 53 may be a general-purpose monitor. By this, it is possible to form a system of operator op-side information provision terminal 50 using a general-purpose monitor, an information processing device (a Personal Computer (PC), a tablet terminal, or the like), or a television receiver. That is, it is possible to form operator op-side information provision terminal 50 with a simple configuration rather than user-side information display terminal 10, and to realize natural and smooth communication between the user and operator op. Furthermore, in a case where the system of operator op-side information provision terminal 50 is formed using the general-purpose monitor and the device, degrees of freedom are provided to layouts of the respective monitor and device, and thus it is possible to normally dispose the respective monitor and device in optimal positions with respect to different operators.

Figure 2:
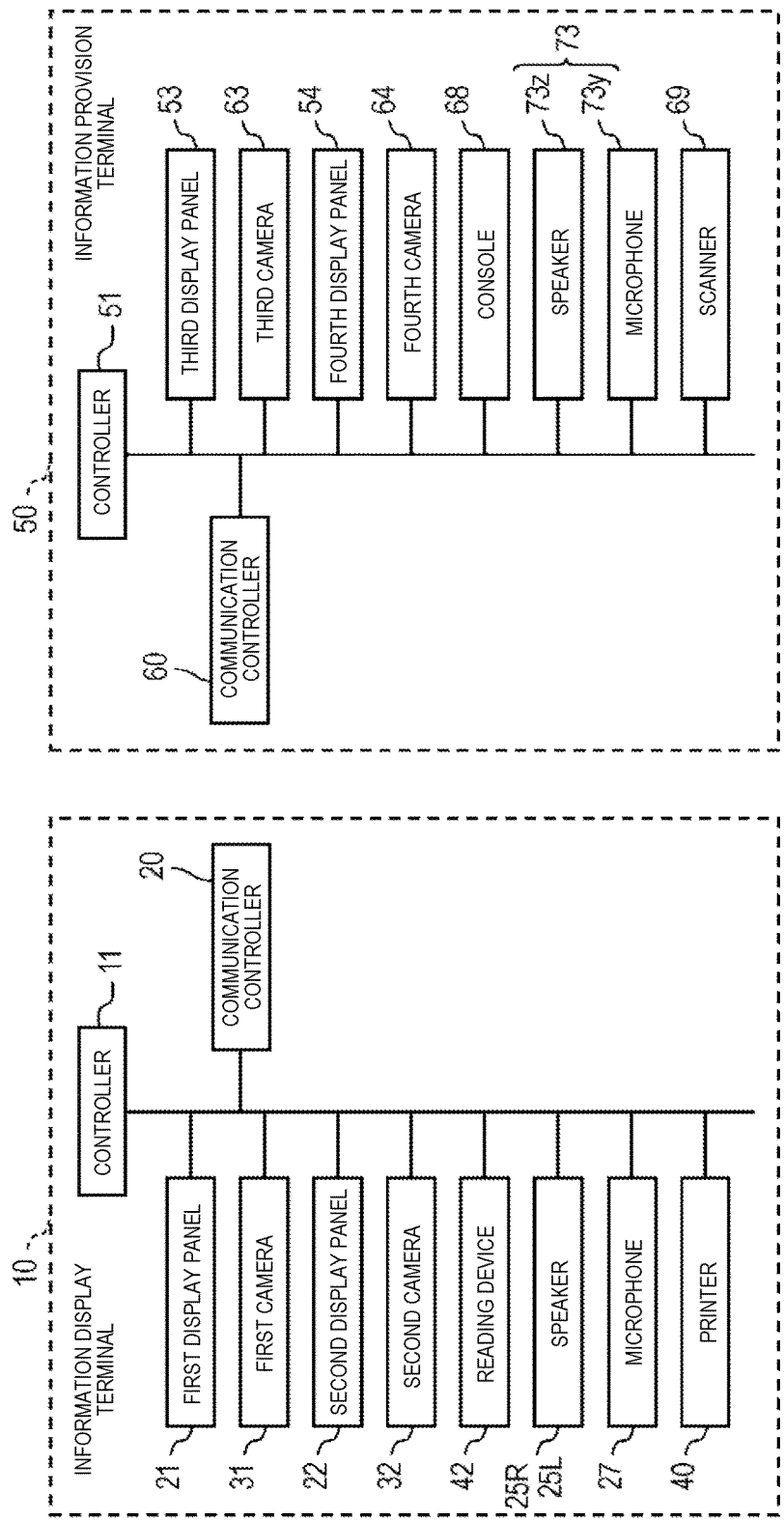
FIG. 2 is a block diagram illustrating an example of inner configurations of an information display terminal and an information provision terminal according to the first exemplary embodiment in detail.
Figure 3:
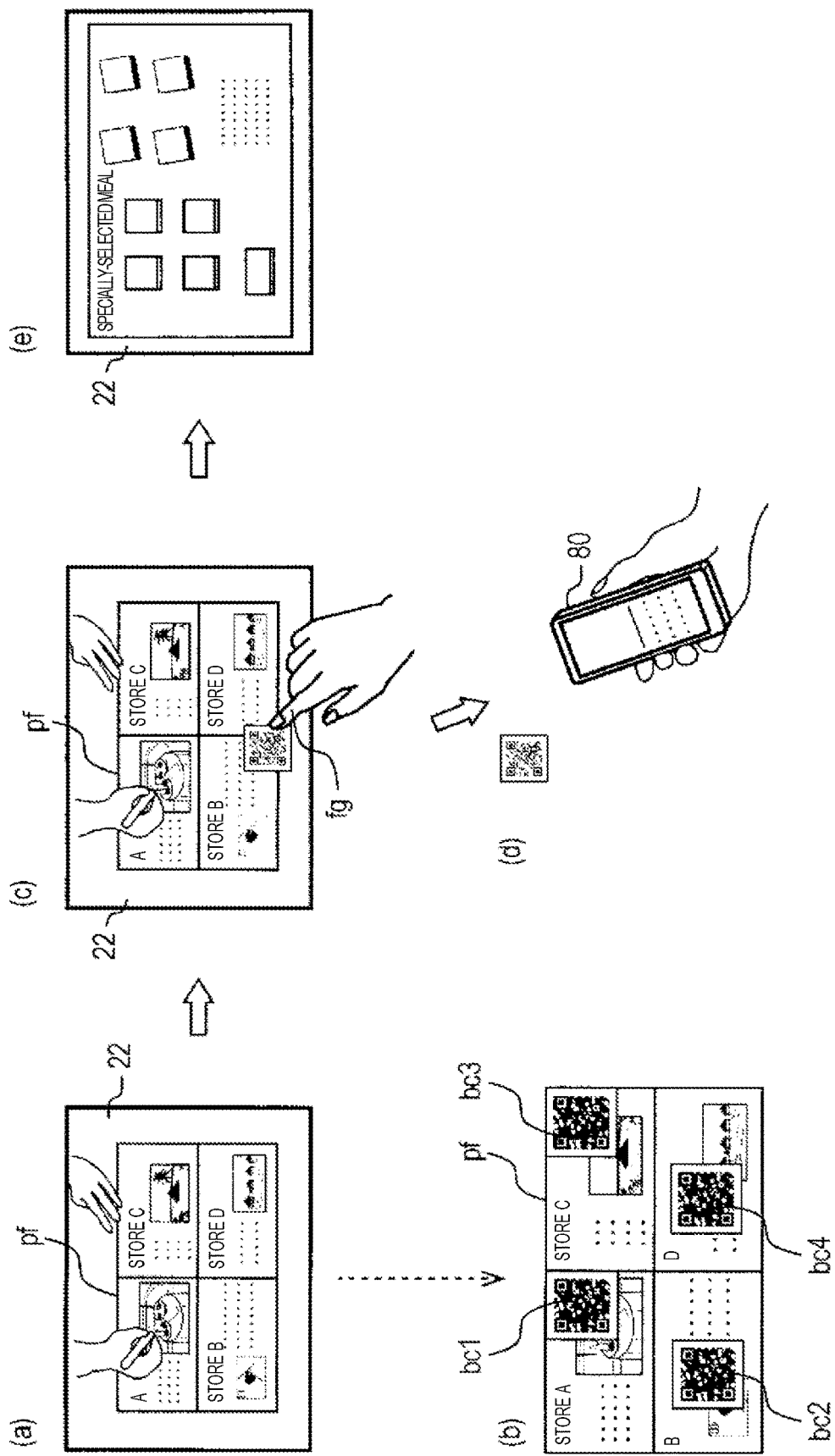
FIGS. 3(*a*) to (*e*) are diagrams illustrating a usage example of the information display system according to a first exemplary embodiment.

FIG. 2 is a block diagram illustrating an example of inner configurations of information display terminal 10 and information provision terminal 50 according to the first exemplary embodiment in detail. Information display terminal 10 includes controller 11 that integrally controls respective units. In addition to the above-described first display panel 21, first camera 31, second display panel 22, second camera 32, reading device 42, right and left speakers 25L and 25R, microphone 27, and printer 40, communication controller 20 is connected to controller 11.

First display panel 21 includes an ultrahigh-resolution 4K (that is, 3840 pixels×2160 pixels) display that displays a part of the face and the upper body of the operator op. Meanwhile, first display panel 21 may include a touch panel on which the user can perform the touch input.

First camera 31 is an internal camera disposed at a bottom of first housing 15, and captures the image of the face and at least the part of the upper body of the user who stands in front of the information display terminal 10. Meanwhile, an angle of view of first camera 31 may be operated by remote control from operator-side information provision terminal 50. A high-resolution full high vision camera, a high vision camera, or a normal camera is used as first camera 31.

Second display panel 22 includes a touch panel which has the 4K display as an interactive display panel, displays the image of the vicinity of the hands of operator op, an operation menu screen, an application screen, a web site, various documents, or the like, and receives button pressing through a touch operation, handwriting input, and the like. In addition, second display panel 22 receives an instruction to enlarge or reduce screen display through an input operation using fingers of the user or a stylus pen.

Second camera 32 is an internal camera which is disposed at an upper part of first housing 15. The angle of view is fixed around second display panel 22, and second camera 32 captures an image of the vicinity of the hands of the user or the like who operates second display panel 22. It is desired that second camera 32 is a high-resolution camera of 4K or full-high vision. Furthermore, in a case where second camera 32 is a PTZ camera and a desired location is zoomed in, it is possible to perform capturing such that details are visually recognized.

Speakers 25L and 25R are directional stereo speakers in which the user who is in front of information display terminal 10 easily hears, and output sound or the like emitted by operator op. Microphone 27 is a directional microphone which has an orientation direction with respect to the user, and absorbs sound emitted by the user. Meanwhile, microphone 27 and speakers 25L and 25R may be formed as a headset. In a case where the user operates information display terminal 10, the user mounts the headset on the head.

Printer 40 is capable of printing a screen of second display panel 22 as hard copy, and performing any one of monochrome printing and color printing. In addition, as a printing method, an inkjet method, a laser printing method, an electrostatic recording method, or the like is used.

Communication controller 20 as an example of a first communicator is a network I/F that performs secure communication through communication controller 60 of information provision terminal 50 and network 90. Specifically, communication controller 20 transmits data which includes the image of the face of the user captured by first camera 31 and the image of the vicinity of the hands of the user captured by second camera 32, to information provision terminal 50. In addition, communication controller 20 receives an image of a face and at least a part of an upper body of the operator and an image of vicinity of hands of the operator which are transmitted from information provision terminal 50.

Reading device 42 reads personal information of the user. For example, a contactless reading and writing device, which reads information of an IC tag through a contactless short distance communication, such as Near Field Communication (NFC), or an IC card reading and writing device, which reads information of an IC card that is inserted into a slot, is provided as reading device 42. Meanwhile, a biometric authentication device, which performs personal authentication using a pattern such as a fingerprint or a vein, may be used. In addition, the personal information of the user, which is read by reading device 42, may be used as the authentication information for a settlement process or electronic money. In a case where the personal authentication is performed, it is possible to enhance convenience and to exclude a forgery or the like.

Meanwhile, information display terminal 10 is a multi-lingual terminal. In a case where the user selects a language which is previously displayed on second display panel 22, information display terminal 10 automatically translates sound emitted by operator op into a selected language and outputs the translated sound through speakers 25L and 25R. In addition, information display terminal 10 has a function of displaying the sound emitted by the operator using text, an OCR function of recognizing handwritten input characters, and the like.

In contrast, information provision terminal 50 includes controller 51 that integrally controls respective units. In addition to the above-described third display panel 53, third camera 63, fourth display panel 54, fourth camera 64, console 68, speaker 73z of headset 73, microphone 73y, and scanner 69, communication controller 60 is connected to controller 51.

Third display panel 53 has a display which displays the image of the face and at least the part of the upper body of the user. Third display panel 53 is not limited to 4K, and may be a normal display, a high vision display, or a full-high vision display. Meanwhile, third display panel 53 may include a touch panel on which it is possible for operator op to perform the touch input.

Third camera 63 is a camera that is attached to stand 58. Third camera 63 captures the image of the face and at least the part of the upper body of operator op, which are displayed on first display panel 21 of information display terminal 10, and thus it is desired that third camera 63 is an ultrahigh-resolution 4K camera.

Fourth display panel 54 includes a touch panel which has a 4K display as an interactive display panel, displays the image of the vicinity of the hands of the user, an operation menu screen, an application screen, a web site, various documents, or the like, and receives button pressing through the touch operation, and the like. In addition, fourth display panel 54 receives an instruction to enlarge or reduce screen display through an input operation using fingers of operator op or a stylus pen.

Fourth camera 64 is a camera which is attached to arm 57, and captures the image of the vicinity of the hands of operator op, the pamphlet, and the like which are placed on a surface of desk 55. Fourth camera 64 captures the picture of the vicinity of the hands displayed on second display panel 22, and thus it is desired that fourth camera 64 is an ultrahigh-resolution 4K camera. Furthermore, in a case of the PTZ camera, it is possible to perform capturing such that details are visually recognized.

Console 68 is an input device, such as a mouse or a keyboard, which can be operated by operator op. Scanner 69 reads and scans the pamphlet or the like.

Headset 73 is mounted on the head of operator op, and includes a left-and-right pair of microphone 73y and speaker 73z, microphone 73y which absorbs sound emitted by operator op, and speaker 73z which outputs sound or the like emitted by the user. Meanwhile, in addition that the left-and-right pair of speaker and microphone are integrated as the headset, the left-and-right pair of speaker and microphone may include stand-alone housings, respectively.

Communication controller 60 as an example of a second communicator is a network I/F that performs secure communication through communication controller 20 of information display terminal 10 and network 90. Specifically, communication controller 60 transmits data, which includes the image of the face and at least the part of the upper body of the operator captured by third camera 63 and an image of the vicinity of the hands of the operator captured by fourth camera 64, to information display terminal 10. In addition, communication controller 60 receives the image of the face of the user and the image of the vicinity of the hands of the user which are transmitted from information display terminal 10.

USAGE EXAMPLE

A usage example of information display system 5 which has the above-described configuration will be illustrated. As the usage example of information display system 5, here, a case where information display system 5 is used to guide a facility in which a service capable of providing high hospitality is demanded is assumed and illustrated. FIGS. 3(a) to (e) are diagrams illustrating the usage example of information display system 5 according to the first exemplary embodiment. As illustrated in (a) of the drawing, an image (picture) of store guide pamphlet pf posted up by operator op is displayed on second display panel 22 of user-side information display terminal 10. Here, four stores (store A, store B, store C, and store D) are introduced.

2D barcodes are respectively listed on introduction fields of the four stores. As illustrated in (b) of the drawing, four 2D barcodes bc1, bc2, bc3, and bc4, which are listed in pamphlet pf are captured (that is, read) by operator-side information provision terminal 50 in advance. In a case where information provision terminal 50 transmits picture data of pamphlet pf to information display terminal 10, information provision terminal 50 separately transmits picture data of four 2D barcodes bc1, bc2, bc3, and bc4 to information display terminal 10. However, the introduction field and the 2D barcode of each store are associated with each other by each reading position.

A case where the user views pamphlet pf projected onto second display panel 22 and determines to desire to know, for example, store information of store B will be described.

As illustrated in (c) of the drawing, in a case where the user performs the touch input on a part where the introduction field of store B of second display panel 22 is displayed, second display panel 22 enlarges and displays 2D barcode bc2 of store B such that 2D barcode bc2 of store B overlaps the introduction field of store B.

In a case where 2D barcode bc2 of store B is enlarged and displayed, the user captures 2D barcode bc2 using a 2D barcode reading function of smart phone 80 with respect to enlarged 2D barcode bc2 and acquires pieces of relevant information (for example, URL, coupons, and the like of store B), as illustrated in (d) of the drawing.

In addition, as illustrated in (e) of the drawing, in a case where the user performs a tap operation with respect to 2D barcode bc2 displayed on second display panel 22, information display terminal 10 reads 2D barcode bc2, on which the tap operation is performed, and displays a web site (that is, information provision screen) of store B on second display panel 22 based on the URL of store B embedded in 2D barcode bc2. In addition, at this time, information of 2D barcode bc2, which is read through the tap operation of the user, is transmitted from information display terminal 10 to information provision terminal 50, and information provision terminal 50 displays the same web site of store B of the user on fourth display panel 54. Here, store B is a restaurant, and specially selected meals are introduced as a meal menu on the web site of store B. Therefore, it is possible for the user and operator op to share and view the same web site.

In addition, on each screen, a captured picture of vicinity of the hands is displayed together. In a case where the web site (that is, information provision screen) is displayed, second display panel 22 may be divided, and the information provision screen may be displayed on a screen which is separated from a screen, on which the picture of the vicinity of the hands is displayed, or may be displayed on second display panel 22 while overlapping the picture of the vicinity of the hands. In a case where the picture of the vicinity of the hands and the information provision screen are displayed together, convenience is improved. For example, it is possible for the operator to guide the user with finger indication. In contrast, it is possible for the user to ask a question at the operator with finger indication. Therefore, it is possible to accurately transmit information to the partner. Accordingly, information transmission speeds up, and it is possible for the user to gain satisfaction with appropriate advices. Hereinafter, in the same manner, screen information, which is deployed through the tap operation performed by the user or operator op, is shared by performing mutual communication.

In addition, the user operates printer 40, prints hard copy of the screen of second display panel 22, thereby being capable of immediately acquiring the screen information proposed by operator op. Therefore, convenience of information display terminal 10 is more improved.

As described above, in a case where the user views pamphlet pf introduced by operator op and touches a favorite store, it is possible to view a meal menu of the store. In addition, in a case where the user acquires the coupons using smart phone 80 and visits the store, it is possible to receive a discount on a meal.

ANOTHER USAGE EXAMPLE

As the usage example of information display system 5, for example, individual guidance at a tutoring school, fortune telling, taking lessons, such as cooking, handcraft, and calligraphy, sightseeing guide, check-in at an airport and procedure support at an information desk, purchase procedure services and support at a convenience store and a store, an unmanned store for travel, borrowing, or the like, guidance and explanation correspondence at a place of drug sale and provision, digital signage, and the like are given as the usage example, in addition to the facility guidance. For example, in a case where various travel plans are introduced and a contract is made between a user who is a tourist and a staff of a travel company in a domestic or foreign travel, it is possible to use information display system 5.

As described above, in information display system 5 according to the first exemplary embodiment, first display panel 21 displays a part of the face and the upper body of the operator op captured by third camera 63, and second display panel 22 displays the hands of operator op captured by fourth camera 64 in information display terminal 10. In information provision terminal 50, third display panel 53 displays the face of the user captured by first camera 31, and fourth display panel 54 displays the hands of the user captured by second camera 32. Therefore, compared to an information display terminal according to the related art, natural exchange is performed between the user and the operator, and the user is capable of accurately and simply transmitting information and, furthermore, is capable of being taught in a state of receiving the sense of realism that the user actually faces the operator who is a communication partner.

Second Embodiment

Figure 4:
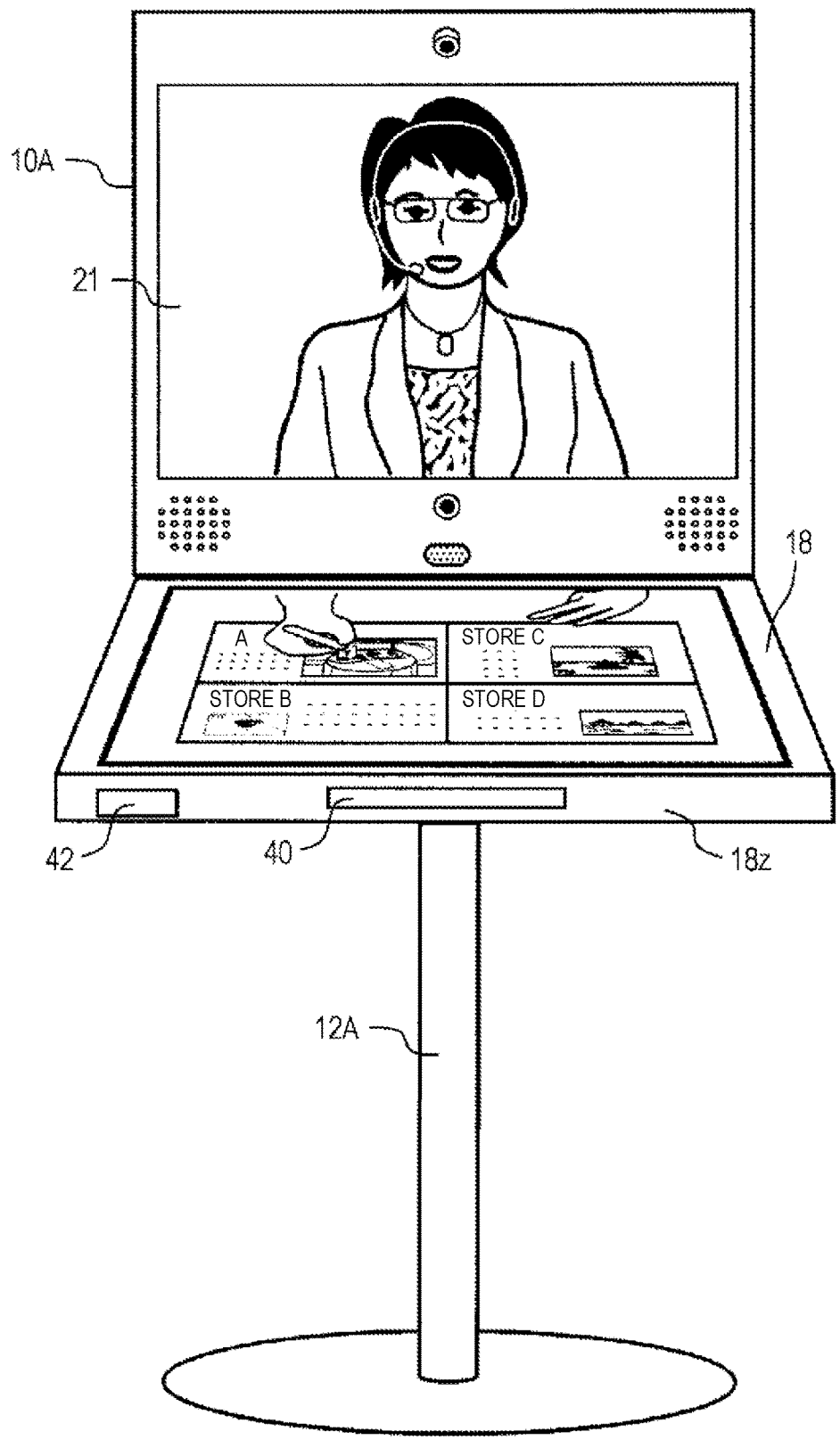
FIG. 4 is a front view illustrating an example of an appearance of an information display terminal according to a second exemplary embodiment.

In a second exemplary embodiment, an information display terminal, which has a different style compared to the first exemplary embodiment, is illustrated. FIG. 4 is a front view illustrating an example of an appearance of information display terminal 10A according to the second exemplary embodiment. The same reference symbols are used for components which are the same as in the first exemplary embodiment, and description thereof will not be repeated.

Information display terminal 10A includes table stand 12A as a stand, and has a style (so-called cafe style) which is suitable for installation of a store such as a cafe.

In addition, in a case of the style, an exhaust slot of printer 40 is disposed on front end surface 18z of second housing 18, and a printer which is contained in second housing 18 is a small printer. Meanwhile, in the case of the style, the printer may not be mounted on the information display terminal.

The user stands in front of information display terminal 10A in a facility that includes a stylish store such as the cafe, and is capable of accepting various pieces of guidance with a sense of realism that the user actually communicates with operator op who is projected onto first display panel 21.

Third Embodiment

FIG. 5 is a diagram illustrating an example of display of information inside a store where information display terminal 10B according to a third exemplary embodiment is installed. Information display terminal 10B has the same cafe style as in the second exemplary embodiment. In addition, unlike the second exemplary embodiment, a transparent screen, onto which an image is projected by a projector installed on a backside of a rear of first display panel 21A, is used as first display panel 21A onto which the image of the face and at least the part of the upper body of the operator captured by third camera 63, are projected.

In a case where an image is projected onto first display panel 21A, first display panel 21A reflects the picture of the face and the part of the upper body of the operator captured by third camera 63. In FIG. 5, in first display panel 21A, a tourist hotel guidance message "Hakata hotel is near here. Here has a map.", which is transmitted from information provision terminal 50, is displayed together with a picture captured by third camera 63.

In contrast, in a case (including a default state) where an image is not projected onto first display panel 21A, first display panel 21A functions as transparent screen 101, and the backside of the rear of transparent or translucent first display panel 21A becomes transparent and is seen through.

As described above, in a case where transparent screen 101 is used, first display panel 21A is seen through, with the result that a field of view is not obstructed, and thus the user looks out over inside the store. In addition, in the case where the image is not projected, first display panel 21A does not display anything, and thus electric power is saved.

As described above, various exemplary embodiments have been described with reference to the accompanying drawings. However, it is apparent that the present disclosure is not limited to the examples. It is apparent that those skilled in the art may perceive various changed examples or modified examples in a category disclosed in claims, and it is understood that the changed examples or the modified examples belong to a technical range of the present disclosure.

For example, in the exemplary embodiments, in a case where the information display terminal projects the image of the face and at least the part of the upper body of the operator, a chest part is projected as at least a part of the upper body which is felt most naturally. However, an elbow part or a lumbar part may be projected. In addition, a head part or only a face may be projected without projecting the upper body. In addition, it is desired that the face and a part of the upper body, which are projected onto the display panel, are projected to coincide with actual sizes, thereby providing further natural feeling. In addition, in a case where the information display terminal includes a life-sized display panel, a whole body of the operator may be projected. In this case, the operator may have a standing posture or a sitting posture similar to the user.

INDUSTRIAL APPLICABILITY

It is possible to use the present disclosure as an information display system and an information display terminal, in which, in a case where information is displayed, it is possible to provide the sense of realism that a user actually faces a communication partner and to accurately and simply transmit the information.

REFERENCE MARKS IN THE DRAWINGS

5 INFORMATION DISPLAY SYSTEM
10, 10A, 10B INFORMATION DISPLAY TERMINAL
11, 51 CONTROLLER
12 STAND
12A TABLE STAND
15 FIRST HOUSING
15z MIDDLE PART
18 SECOND HOUSING
18z FRONT END SURFACE
20, 60 COMMUNICATION CONTROLLER
21, 21A FIRST DISPLAY PANEL
22 SECOND DISPLAY PANEL
25L, 25R SPEAKER
27 MICROPHONE
31 FIRST CAMERA
32 SECOND CAMERA
40 PRINTER
42 READING DEVICE
50 INFORMATION PROVISION TERMINAL
53 THIRD DISPLAY PANEL
54 FOURTH DISPLAY PANEL
55 DESK
57 ARM
58 STAND
63 THIRD CAMERA
64 FOURTH CAMERA
68 CONSOLE
69 SCANNER
73 HEADSET
80 SMART PHONE
90 NETWORK
101 TRANSPARENT SCREEN
bc1, bc2, bc3, bc4 2D BARCODE
fg FINGER
op OPERATOR
pf PAMPHLET

The invention claimed is:

1. An information display system in which an information display terminal that can be operated by a user and an information provision terminal that can be operated by an operator are communicably connected,
    wherein the information display terminal includes
        a first camera that captures an image of a face of the user;
        a second camera that captures an image of vicinity of hands of the user;
        a first communicator that transmits data, which includes the image of the face of the user captured by the first camera and the image of the vicinity of the hands of the user captured by the second camera, to the information provision terminal, and receives an image of a face and at least a part of an upper body of the operator and an image of vicinity of hands of the operator, which are transmitted from the information provision terminal;
        a first display panel that displays the image of the face and at least the part of the upper body of the operator; and
        a second display panel that displays the image of the vicinity of the hands of the operator,
    wherein the information provision terminal includes
        a third camera that captures the face and at least the part of the upper body of the operator;
        a fourth camera that captures the hands of the operator;
        a second communicator that transmits data, which includes an image of the face and at least the part of the upper body of the operator captured by the third camera, and an image of vicinity of the hands of the operator captured by the fourth camera, to the information display terminal, and receives the image of the face of the user and the image of the vicinity of the hands of the user, which are transmitted from the information display terminal;
        a third display panel that displays the image of the face of the user captured by the first camera; and
        a fourth display panel that displays the image of the vicinity of the hands of the user captured by the second camera, and
    wherein the second camera further captures the second display panel.

2. The information display system according to claim 1, wherein the second display panel displays the image of the vicinity of the hands of the operator together with an information screen.

3. The information display system according to claim 1, wherein the first display panel includes a transparent screen, and causes an image of a backside of a rear of the first display panel to be displayed after being transparent in a case where the image of the face and at least the part of the upper body of the operator are not displayed.

4. The information display system according to claim 1, wherein the information display terminal further includes a printer that is capable of printing the image displayed on the second display panel or data of the screen.

5. The information display system according to claim 1, wherein the information display terminal further includes a reading device that reads authentication information of the user.

6. The information display system according to claim 1, wherein the first display panel is disposed at an upper part of a housing of the information display terminal,
wherein the second display panel is disposed to extend to a front side from a lower part of the housing of the information display terminal, and
wherein at least one of an input device and an output device is disposed at a middle part of the housing on which the first display panel and the second display panel are disposed.

7. The information display system according to claim 1, wherein the first camera, the second camera, the first display panel, and the second display panel are accommodated in one housing, and
wherein the third camera, the fourth camera, the third display panel, and the fourth display panel are physically independent from each other and connected by an arm or a stand.

8. The information display system according to claim 1, wherein the first display panel and the second display panel are arranged in a vertical direction in an order of the first display panel and the second display panel, and
wherein the information display terminal further includes a non-display portion between the first display panel and the second display panel so that the upper body of the operator in the first display and the hand of the operator in the second display are displayed together to display a human body.

9. An information display terminal, which is communicably connected with an information provision terminal that can be operated by an operator and can be operated by a user, comprising:
a first camera that captures an image of a face of the user;
a second camera that captures an image of vicinity of hands of the user;
a communicator that transmits data, which includes the image of the face of the user captured by the first camera and the image of the vicinity of the hands of the user captured by the second camera, to the information provision terminal, and receives an image of a face and at least a part of an upper body of the operator and an image of vicinity of hands of the operator, which are transmitted from the information provision terminal;
a first display panel that displays the image of the face and at least the part of the upper body of the operator; and
a second display panel that displays the image of the vicinity of the hands of the operator;
wherein the second camera further captures the second display panel.

10. An information display method in which an information display terminal that can be operated by a user and an information provision terminal that can be operated by an operator are communicably connected, the information display method comprising:
capturing, using a first camera of the information display terminal, an image of a face of the user;
capturing, using a second camera of the information display terminal, an image of vicinity of hands of the user;
transmitting, using a first communicator of the information display terminal, first data from the information display terminal to the information provision terminal, the first data including the image of the face of the user captured by the first camera and the image of the vicinity of the hands of the user captured by the second camera;
capturing, using a third camera of the information provision terminal, the face and at least the part of the upper body of the operator;
capturing, using a fourth camera of the information provision terminal, that captures the hands of the operator;
transmitting, using a second communicator of the information provision terminal, second data from the information provision terminal to the information display terminal, the second data including an image of the face and at least the part of the upper body of the operator captured by the third camera, and an image of vicinity of the hands of the operator captured by the fourth camera;
receiving, using the first communicator of the information display terminal, the second data from the information provision terminal;
receiving, using the second communicator of the information provision terminal, the first data from the information display terminal;
displaying, using the received second data and a first display panel of the information display terminal, the image of the face and at least the part of the upper body of the operator;
displaying, using the received second data and a second display panel of the information display terminal, the image of the vicinity of the hands of the operator;
displaying, using the received first data and a third display panel of the information provision terminal, the image of the face of the user captured by the first camera; and
displaying, using the received first data and a fourth display panel of the information provision terminal, the image of the vicinity of the hands of the user captured by the second camera,
wherein in the capturing using the second camera, the second camera further captures the second display panel.

* * * * *